(12) United States Patent
Xia et al.

(10) Patent No.: US 10,988,553 B2
(45) Date of Patent: Apr. 27, 2021

(54) CATALYST PRE-CONTACT DEVICE FOR CONTINUOUS POLYMERIZATION OF OLEFINS AND METHOD FOR CATALYST PRE-CONTACT

(71) Applicants: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

(72) Inventors: Xianzhi Xia, Beijing (CN); Tianyi Zhang, Beijing (CN); Yuexiang Liu, Beijing (CN); Jin Zhao, Beijing (CN)

(73) Assignees: CHINA PETROLEUM & CHEMICAL CORPORATION, Beijing (CN); BEIJING RESEARCH INSTITUTE OF CHEMICAL INDUSTRY, CHINA PETROLEUM & CHEMICAL CORPORATION, Beijing (CN)

( * ) Notice: Subject to any disclaimer, the term of this patent is extended or adjusted under 35 U.S.C. 154(b) by 91 days.

(21) Appl. No.: 16/312,962

(22) PCT Filed: Jun. 23, 2017

(86) PCT No.: PCT/CN2017/089759
§ 371 (c)(1),
(2) Date: Dec. 21, 2018

(87) PCT Pub. No.: WO2017/220018
PCT Pub. Date: Dec. 28, 2017

(65) Prior Publication Data
US 2019/0218314 A1    Jul. 18, 2019

(30) Foreign Application Priority Data

Jun. 23, 2016  (CN) .......................... 201610465431.4
Jun. 23, 2016  (CN) .......................... 201610466027.9

(51) Int. Cl.
*C08F 2/01*        (2006.01)
*C08F 2/34*        (2006.01)
(Continued)

(52) U.S. Cl.
CPC ................. *C08F 2/01* (2013.01); *B01J 8/10* (2013.01); *B01J 19/18* (2013.01); *B01J 19/1831* (2013.01);
(Continued)

(58) Field of Classification Search
CPC ..... C08F 2/01; C08F 2/34; C08F 10/02; B01J 19/1831; B01J 37/0072; B01J 8/10
See application file for complete search history.

(56) References Cited

U.S. PATENT DOCUMENTS

| 6,043,324 A * | 3/2000 | Karbasi ................. C08F 10/00 526/125.3 |
| 2009/0110600 A1 | 4/2009 | Holl |
| 2009/0326168 A1 | 12/2009 | Burns et al. |

FOREIGN PATENT DOCUMENTS

| CN | 1330086 A | 1/2002 |
| CN | 101613426 A | 12/2009 |

(Continued)

OTHER PUBLICATIONS

European Patent Office; Extended European Search Report; Application No. EP17814756.7; dated Jan. 20, 2020.

*Primary Examiner* — Robert D Harlan
(74) *Attorney, Agent, or Firm* — Novick, Kim & Lee, PLLC; Allen Xue

(57) ABSTRACT

Disclosed is a catalyst pre-contact method for the continuous polymerization of an olefin, wherein a primary catalyst, a
(Continued)

co-catalyst and, optionally, an external electron donor are mixed and then undergo a pre-contact reaction, with the pre-contact reaction temperature being −30° C. to 35° C. and adjustable, and the pre-contact reaction time being 0.5 min to 10 min and adjustable, and the pre-contacted catalyst is brought into a catalyst prepolymerization system and then into a catalyst polymerization system, or is directly brought into the catalyst polymerization system. Further disclosed is a catalyst pre-contact device for the continuous polymerization of an olefin, which can adjust the pre-contact time and pre-contact temperature of the catalyst so that the performance of the catalyst achieves a better level according to the process.

16 Claims, 17 Drawing Sheets

(51) Int. Cl.
| | |
|---|---|
| *B01J 8/10* | (2006.01) |
| *B01J 19/18* | (2006.01) |
| *B01J 37/00* | (2006.01) |
| *C08F 10/00* | (2006.01) |
| *C08F 4/00* | (2006.01) |
| *C08F 10/02* | (2006.01) |

(52) U.S. Cl.
CPC ............ *B01J 37/0072* (2013.01); *C08F 2/34* (2013.01); *C08F 4/00* (2013.01); *C08F 10/00* (2013.01); *B01J 2219/0004* (2013.01); *B01J 2219/00033* (2013.01); *B01J 2219/00094* (2013.01); *B01J 2219/00166* (2013.01); *C08F 10/02* (2013.01)

(56) References Cited

FOREIGN PATENT DOCUMENTS

| CN | 201694979 U | 1/2011 |
|---|---|---|
| CN | 104558297 A | 4/2015 |
| EA | 011766 B1 | 6/2009 |
| EP | 0559633 A2 | 9/1993 |
| EP | 0588277 A2 | 3/1994 |
| EP | 3476473 A1 | 5/2019 |
| JP | 2001348405 A | 12/2001 |
| WO | 2012092415 A1 | 7/2012 |
| WO | 2014062643 A1 | 4/2014 |
| WO | 2015059117 A1 | 4/2015 |
| WO | 2017222048 A1 | 12/2017 |

* cited by examiner

CATALYST PRE-CONTACT DEVICE FOR CONTINUOUS POLYMERIZATION OF OLEFINS AND METHOD FOR CATALYST PRE-CONTACT

FIELD OF THE INVENTION

The invention belongs to olefin polymerization field, and particularly relates to catalyst pre-contact devices for olefin continuous polymerization and methods for catalyst pre-contact.

BACKGROUND ART

At present, main catalysts used in olefin polymerization reactions are mostly solid particulate catalysts, including spherical or near-spherical solid main catalysts. One addition manner of the solid main catalyst is to formulate the main catalyst into slurry or paste having a certain concentration and, after having pre-contacted with a cocatalyst and an optional external electron donor, is fed by a metering system to a subsequent polymerization reactor system. Therefore, catalyst pre-contact is known. See for example Chinese Patent Application No. 96193736.X and 201020206046.6. FIG. 1 schematically describes a catalyst pre-contact process used in the existing industrial plants. As shown in FIG. 1, the existing industrial slurry or liquid catalyst pre-contact device comprises a catalyst pre-contact tank, and a slurry or liquid catalyst from a slurry or liquid catalyst feeding pipeline is transported by a metering pump and enters the catalyst pre-contact tank via an insert tube. Cocatalyst such as triethylaluminum and external electron donor, after having been combined, are also introduced into the catalyst pre-contact tank. The catalyst pre-contact tank has a stirring means, which is used to sufficiently mix three-agents to conduct the pre-contact reaction. The pre-contacted catalyst enters a subsequent catalyst pre-polymerization system or directly enters a main polymerization reaction system.

However, there is no prior art teaching to adjust catalyst pre-contact conditions such as pre-contact temperature and pre-contact time to optimize the polymerization performance of the catalyst.

Disclosures of the Invention

The inventors have surprisingly found that conditions under which a catalyst pre-contacts with a cocatalyst and optionally an external electron donor can influence performance of the catalyst, and the performance of the catalyst can be optimized by adjusting pre-contact temperature and pre-contact time. On this basis, the invention has been made.

An object of the present invention is to provide a catalyst pre-contact method for olefin continuous polymerization, wherein a main catalyst, a cocatalyst and an optional external electron donor are combined to conduct a pre-contact reaction, with a pre-contact temperature ranging from −30° C. to 40° C. and being adjustable, a pre-contact time ranging from 0.5 min to 70 min and being adjustable, and a pre-contacted catalyst entering catalyst pre-polymerization system and then catalyst polymerization system or, alternatively, directly entering catalyst polymerization system.

Another object of the present invention is to provide a catalyst pre-contact device comprising a catalyst pre-contact tank and at least one catalyst pre-contact coil connected to the catalyst pre-contact tank, with the catalyst pre-contact coil being provided with at least two valved inlets/outlets.

Still another object of the present invention is to provide a catalyst pre-contact device comprising a catalyst pre-contact coil, wherein the catalyst pre-contact coil is provided with valved inlet(s) and are connected with at least two feeding pipelines, wherein one feeding pipeline is connected to the beginning end of the catalyst pre-contact coil, and the other feeding pipelines are connected with the catalyst pre-contact coil via the inlet(s).

Yet still another object of the present invention is to provide a catalyst pre-contact device comprising a plurality of mini catalyst pre-contact tanks in series, with each of the mini catalyst pre-contact tanks having a jacket and a stirring means.

The catalyst pre-contact method and device according to the invention may be broadly used in olefin polymerization processes, in particular in liquid phase bulk-gas phase olefin polymerization processes. The catalyst pre-contact device can precisely control pre-contact time and pre-contact temperature of the catalyst over a relatively wide range and ensure the pre-contacted materials not to be backmixed, and the investment cost is low.

DESCRIPTION OF THE PREFERRED EMBODIMENTS

Figure 1:
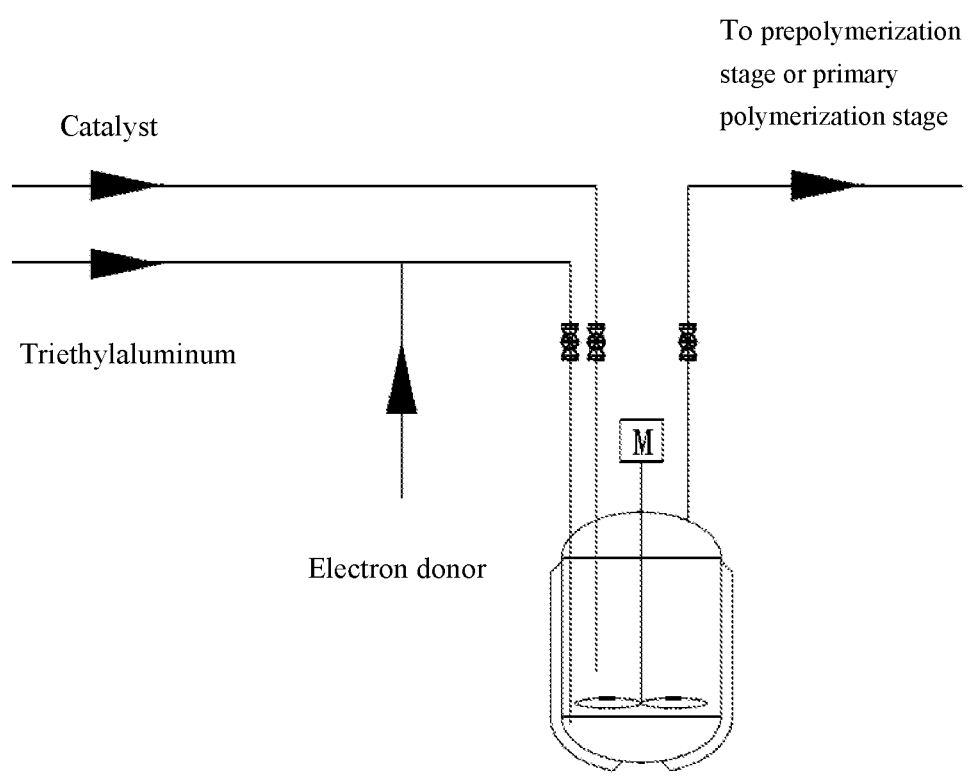
FIG. 1 is a schematic diagram of a catalyst pre-contact device currently used in industrial production and pilot plants.

Specific embodiments of the invention will be described in detail below. It is understood that the specific embodiments described herein are merely illustrative and explanatory of the invention and are not intended to limit the invention.

In the invention, the term "catalyst components" refers to conventional catalyst components for olefin polymerization reaction, including a main catalyst, a cocatalyst (for example, triethylaluminum) and an optional external electron donor (for example, methyl cyclohexyl dimethoxysilane). For convenience of description, the main catalyst, the cocatalyst and the optional electron donor are sometimes collectively referred to as "three-agents" hereinafter.

As used herein, the term "catalyst pre-contact" refers to the mixing and contacting of the main catalyst, the cocatalyst and the optional external electron donor prior to prepolymerization or polymerization. The resultant product after the catalyst pre-contact is a catalytically active polyolefin catalyst.

As used herein, the term "catalyst pre-contact time" refers to a period of time lasting from the initiation of contact of the main catalyst with the cocatalyst and the optional external electron donor to the entering of the contacted polyolefin catalyst into the prepolymerization unit (when present) or polymerization unit (when the pre-polymerization unit is absent).

In a first aspect, the invention provides a catalyst pre-contact method for olefin continuous polymerization, wherein a main catalyst, a cocatalyst and an optional external electron donor are combined to conduct a pre-contact reaction, with a pre-contact temperature ranging from −30° C. to 40° C. and being adjustable, a pre-contact time ranging from 0.5 min to 70 min and being adjustable, and a pre-contacted catalyst entering pre-polymerization system and then polymerization system or, alternatively, directly entering polymerization system, depending on polymerization process requirements.

In some embodiments where the polymerization system utilizes a liquid phase bulk polymerization process, the pre-contact time ranges from 1 min to 20 min, preferably from 1 min to 15 min, more preferably from 1 min to 10 min, and still more preferably from 1 min to 9 min, and the pre-contact temperature ranges from −25° C. to 15° C., preferably from −25° C. to 10° C., and more preferably from −20° C. to 8° C.

In other embodiments where the polymerization system utilizes a gas phase polymerization process, the pre-contact reaction time ranges from 1 min to 20 min, preferably from 1 min to 15 min, and more preferably from 1 min to 10 min, and the pre-contact reaction temperature ranges from −30° C. to 30° C., preferably from −25° C. to 20° C., and more preferably from −10° C. to 10° C.

In some embodiments, the catalyst pre-contact method comprises the steps of:
  providing a catalyst;
  determining desired temperature and desired duration for pre-contacting the catalyst with the cocatalyst and the optional external electron donor through laboratory polymerization evaluation experiments;
  contacting the catalyst with the cocatalyst and the optional external electron donor in a pre-contact device at the desired pre-contact temperature plus/minus 3° C. for the desired duration plus/minus 2 min, to provide a pre-contacted catalyst; and
  then feeding the pre-contacted catalyst into a pre-polymerization system and then a polymerization system or, alternatively, directly into a polymerization system, depending on polymerization process requirements.

The techniques of laboratory polymerization evaluation are known per se. It is feasible to determine the desired temperature and desired duration for pre-contacting the catalyst with the cocatalyst and the optional external electron donor by laboratory polymerization evaluation experiments. The main factors to be considered in determining the desired temperature and the desired duration are the polymerization activity of the catalyst, the melt flow index and isotactic index of the resulting polymer, and the like.

In some embodiments, the catalyst pre-contact method is implemented by a device for pre-contacting the catalyst with the cocatalyst and the optional external electron donor, the pre-contact device comprising at least two mini catalyst pre-contact tanks in series or a tubular unit having at least two, preferably from 2 to 20, and more preferably from 3 to 10 inlets/outlets.

In some preferred embodiments, the method comprises the steps of: a) feeding the main catalyst, the cocatalyst, and the optional external electron donor to a catalyst pre-contact tank; b) passing the mixture obtained in step a) via a selected inlet to a catalyst pre-contact control device; and passing the mixture via the catalyst pre-contact control device to the prepolymerization system and then to the polymerization system, or directly to the polymerization system. By selecting different inlets, the pre-contacted catalyst will pass through different lengths of tubing to the subsequent prepolymerization system or polymerization system, thereby allowing for adjustment of the pre-contact time.

In a particular embodiment, the method comprises the steps of: continuously passing the main catalyst via a catalyst feeding line through a metering means into the catalyst pre-contact tank; passing the cocatalyst such as triethyl aluminum and the external electron donor through respective metering means, then combining and continuously feeding them into the catalyst pre-contact tank, where the contents are thoroughly mixed under high-speed agitation; then, selecting a corresponding inlet on the catalyst pre-contact coil according to set pre-contact time so that the three-agents will enter, in overflow form or other form, the catalyst pre-contact control coil via the selected inlet and then enter a downstream unit through the catalyst pre-contact control coil. In the catalyst pre-contact tank, a stirring speed may be from 50 to 2000 rpm, preferably from 100 to 1000 rpm, and more preferably from 200 to 800 rpm.

In the method of the invention, the temperature at which the catalyst pre-contact is conducted is also controlled. There is no particular limitation on the method of controlling the catalyst pre-contact temperature. Conveniently, the catalyst pre-contact temperature is controlled by a thermostatic bath or jacket disposed outside of the apparatus for conducting the catalyst pre-contact such as pre-contact tank or pre-contact coil or both, as described below.

In a second aspect, the invention provides a catalyst pre-contact device for olefin continuous polymerization, which catalyst pre-contact device comprises a catalyst pre-contact tank and at least one catalyst pre-contact coil connected to the catalyst pre-contact tank, with the catalyst pre-contact coil being provided with at least two valved inlets.

Figure 2:
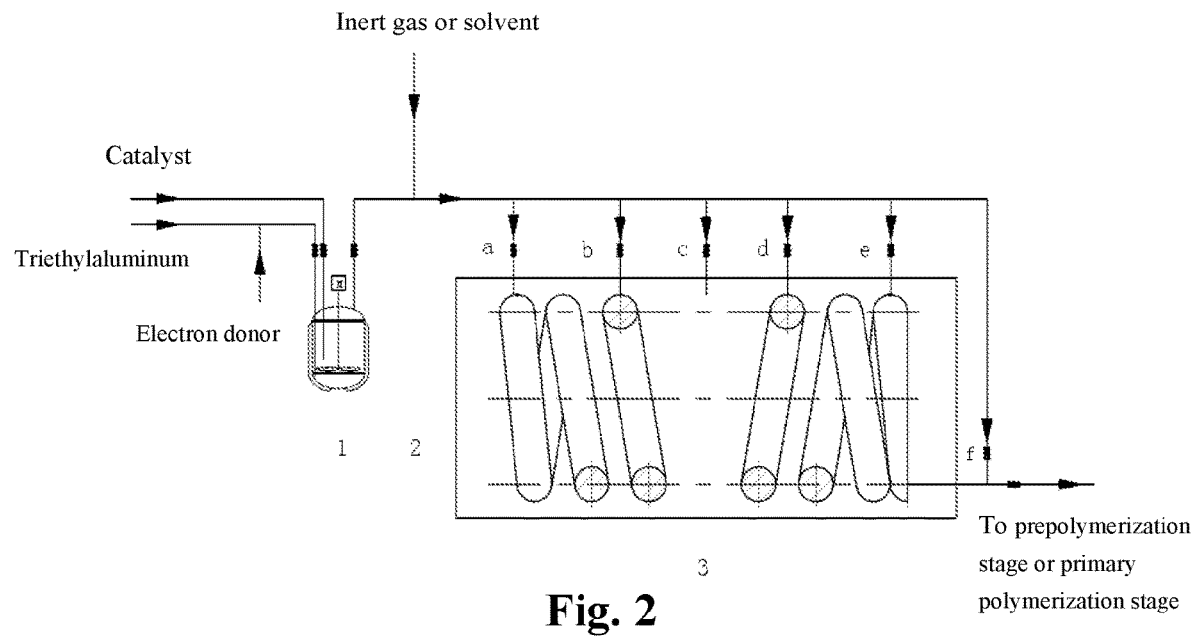
FIG. 2 is a schematic diagram of a catalyst pre-contact device in accordance with an embodiment of the invention.

FIG. 2 describes a catalyst pre-contact device in accordance with an embodiment of this aspect of the invention, wherein 1 represents the catalyst pre-contact tank, 2 represents the catalyst pre-contact coil, 3 represents a thermostatic bath, and a, b, c, d, e and f represents the valved inlets.

In some embodiments, the catalyst pre-contact tank is connected to the catalyst pre-contact coil through a valved pipeline.

In some embodiments, the catalyst pre-contact coil is an internally polished coil.

In the invention, the catalyst pre-contact coil may be of any shape that ensures no dead angle in the coil, thereby allowing the components of the catalyst to pass smoothly. In a preferred embodiment, the catalyst pre-contact coil is of spring shape. In another preferred embodiment, the catalyst pre-contact coil is a serpentine tube.

In the invention, there is no particular limitation to the placing manner of the catalyst pre-contact coil, as long as the smooth flow of the catalyst components can be ensured. For example, the catalyst pre-contact coil can be placed horizontally, vertically, or at any other angle, while ensuring the smooth flow of the catalyst components.

The catalyst pre-contact coil is provided with at least two valved inlets. There is no particular limitation to the upper limit of the number of the inlets, and the upper limit is mainly determined by the requirements of the polymerization process and the convenience of equipment processing. For example, the catalyst pre-contact coil 2 can be provided with from 2 to about 20, and preferably from 2 to about 10 valved inlets.

The valved inlets can be provided anywhere in the catalyst pre-contact coil. An arrangement of the inlets is schematically depicted in FIG. 2. As shown in FIG. 2, according to the flow direction of the materials, the inlets can be provided at the beginning of the coil (inlet a) and further anywhere in the middle of the coil (for example, inlets b, c, d and e). In addition, a valved inlet may be further provided at the outlet line at the end of the coil (inlet f), in which case the materials from the catalyst pre-contact tank are directed to the downstream unit through the inlet f.

According to an embodiment of the invention, the catalyst pre-contact device is tailored to the process requirements, wherein the number and position of the valved inlets can be freely set according to the desired material pre-contact time of the continuous olefin polymerization process. For example, in a particular continuous olefin polymerization process where the desired pre-contact time of three-agents has been determined, one valved inlet is provided at a corresponding location on the coil; in other continuous olefin polymerization processes where, in consideration of different aspects (for example, catalyst activity, polyolefin isotactic index or melt index, etc.), it is necessary to adjust the pre-contact time of three-agents to meet different requirements, one or more valved inlets are provided at the corresponding locations on the coil.

According to another embodiment of the invention, the catalyst pre-contact device includes a catalyst pre-contact coil provided with a plurality of valved inlets, wherein the plurality of valved inlets are provided on the catalyst pre-contact coil at substantially equal intervals from the beginning of the catalyst pre-contact coil. In practice, a particular inlet is selected as desired so that the actual catalyst pre-contact time is as close as possible to the determined desired catalyst pre-contact time.

In some embodiments, in order to prevent the three-agents, which have entered the coil through an inlet, from flowing back into the portion of the coil before said inlet, the catalyst pre-contact coil is preferably further provided with anti-backflowing valves. Preferably, one anti-backflowing valve is provided immediately upstream of each inlet except for the inlet provided at the beginning of the catalyst pre-contact coil.

The catalyst pre-contact coil may generally have a diameter of from 3 to 25 mm. The total length of the catalyst pre-contact coil can be determined based on the maximum residence time of the three-agents passing through the conduit. Depending on the polymerization activity of the olefin polymerization catalyst and the capacity of the polymerization plant, the catalyst pre-contact coil has generally such a total length that a maximum residence time in the conduit of the materials used for the continuous olefin polymerization process is from 50 to 70 minutes. In addition, the total length of the catalyst pre-contact coil can be extended to increase the pre-contact time of three-agents if required by the process.

In the invention, in order to achieve the control of the catalyst pre-contact temperature, the catalyst pre-contact device further comprises a temperature controlling means, and the temperature controlling means can be selected with reference to the prior art.

According to a preferred embodiment, the catalyst pre-contact device further comprises a thermostatic bath, with the catalyst pre-contact coil being located within thermostatic bath, and the control of the temperature of the three-agents in the pre-contact coil is achieved through the thermostatic medium in the thermostatic bath.

According to another preferred embodiment, a jacket is provided outside the catalyst pre-contact coil, i.e., the catalyst pre-contact coil is a jacketed coil. The thermostatic medium enters the jacket to control the pre-contact temperature of the three-agents. Here, the flow directions of the thermostatic medium and the three-agents may be the same or opposite. In the continuous polymerization processes of olefins, preferably, the thermostatic medium and the three-agents flow reversely.

In the invention, the size of the catalyst pre-contact tank can be adjusted according to the capacity of the polymerization apparatus. Typically, the catalyst pre-contact tank is a small agitating tank, which has such a volume that an average residence time in the tank of the materials used for the continuous olefin polymerization process is less than 30 minutes, preferably less than 10 minutes, and further preferably from 0.1 to 5 minutes.

In the present invention, the agitator in the small agitating tank is not particularly limited as long as it can ensure sufficiently mixing. For example, the agitator may be of a single layer, with the agitator form being any one selected from the group consisting of paddle, turbine, propulsion, Brumakin, blade, anchor, frame, ribbon and screw; and the agitator may also be of two or more layers, in which case the agitator may be one or a composite of the aforementioned agitator forms.

In addition, the catalyst pre-contact tank may be further provided with a jacket, and the temperature of the three-agents is controlled by the thermostatic medium in the jacket.

In the catalyst pre-contact device, the catalyst pre-contact coil may be one or more sets of coils. According to an embodiment, the catalyst pre-contact device comprises more than two sets of catalyst pre-contact coils connected in parallel. Such a design allows adjustment of the pre-contact time and/or pre-contact temperature of the three-agents over a wider range and allows at least one set of catalyst pre-contact coils to be used as a backup.

In a third aspect, the invention provides a catalyst pre-contact device for continuous polymerization of olefins, comprising a catalyst pre-contact tank and at least one catalyst pre-contact coil connected to the catalyst pre-contact tank, wherein the catalyst pre-contact coil has one feeding port provided at its beginning end and at least two valved outlets downstream of the beginning end, and materials from the catalyst pre-contact tank will be fed via the feeding port to the catalyst pre-contact coil, withdrawn via one of the outlets, and fed to the prepolymerization unit (when present) or the polymerization unit (when no prepolymerization unit is present). By selecting an outlet through which the contacted materials (i.e., the pre-contacted catalyst) is withdrawn, the catalyst pre-contact time can be controlled.

In this aspect of the invention, the structural and design features of the catalyst pre-contact tank and the at least one catalyst pre-contact coil itself are similar to those as described for the catalyst pre-contact tank and the catalyst pre-contact coil of the catalyst pre-contact device of the second aspect of the invention, except for the anti-backflow valve provided on the catalyst pre-contact coil.

In this aspect of the invention, in order to prevent the three-agents from entering the coil volume behind the selected outlet, the catalyst pre-contact coil is preferably further provided with globe valves. Preferably, one globe valve is provided immediately downstream of each outlet.

Details and preferences of other structural and design features of the catalyst pre-contact tank and the at least one catalyst pre-contact coil can be found in the foregoing descriptions.

In a fourth aspect, the invention provides a catalyst pre-contact device for continuous polymerization of olefins comprising a catalyst pre-contact coil, wherein the catalyst pre-contact coil is provided with valved inlets and are connected with at least two feeding pipelines, wherein one feeding pipeline is connected to the beginning end of the catalyst pre-contact coil, and the other feeding pipelines are connected with the catalyst pre-contact coil via the inlets.

Figure 3:
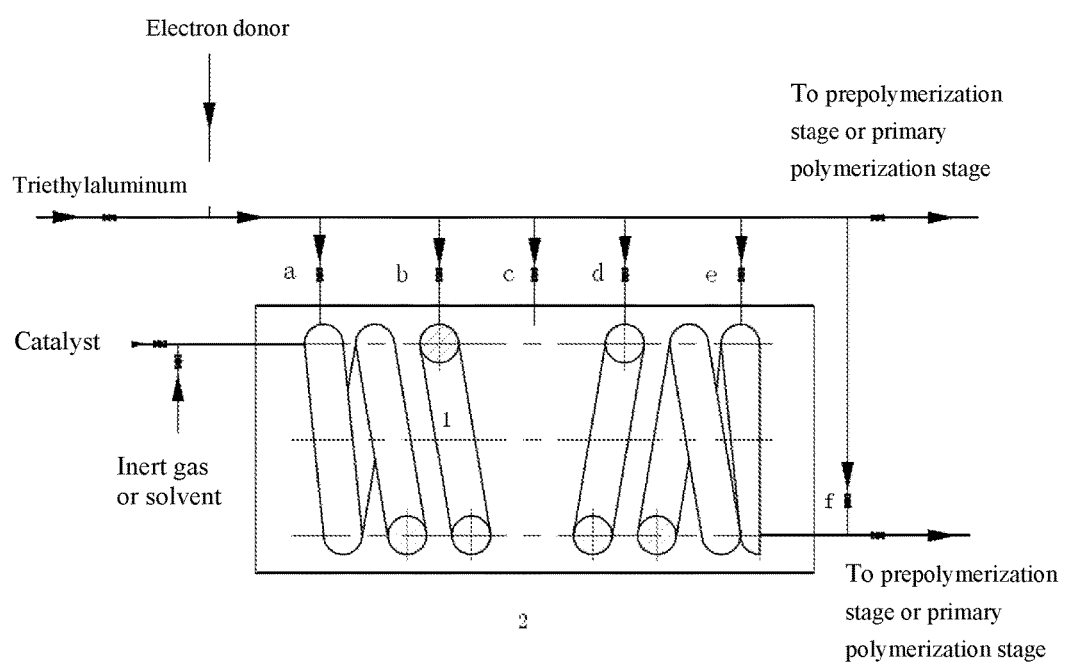
FIG. 3 is a schematic diagram of a catalyst pre-contact device in accordance with another embodiment of the invention.
Figure 4A:
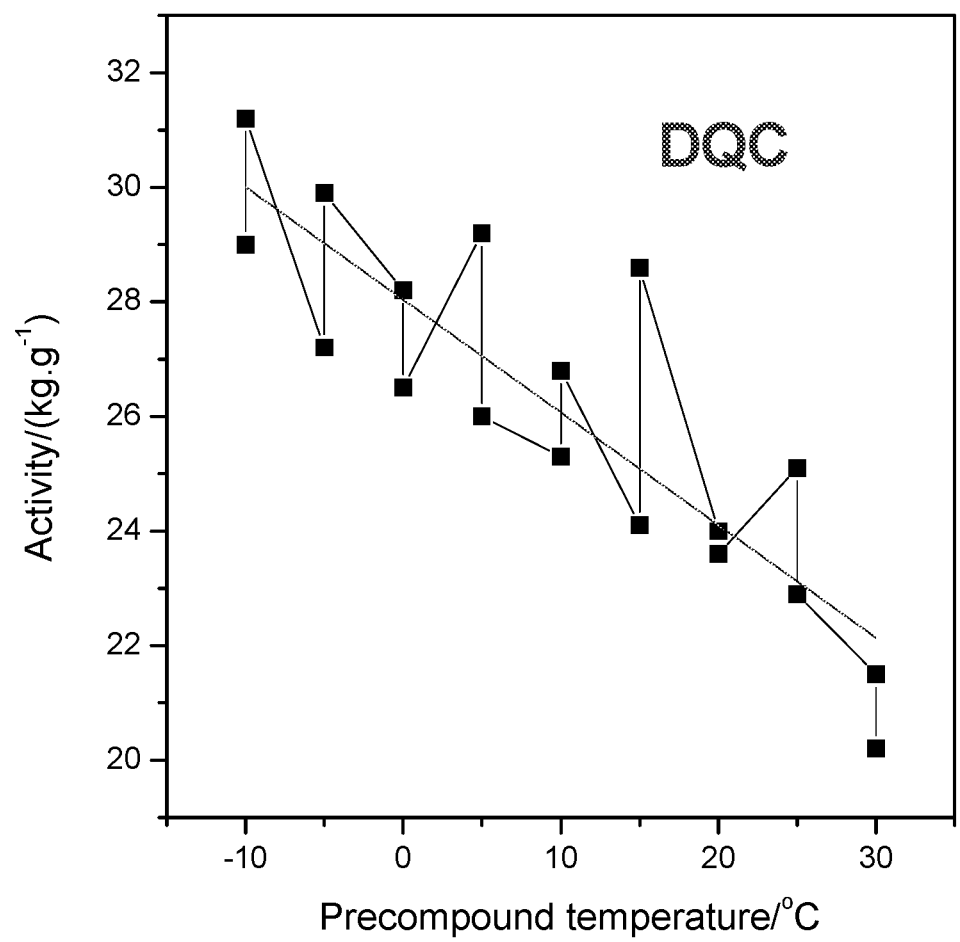
FIG. 4a depicts a plot of activity versus pre-contact temperature for catalyst A.
Figure 4B:
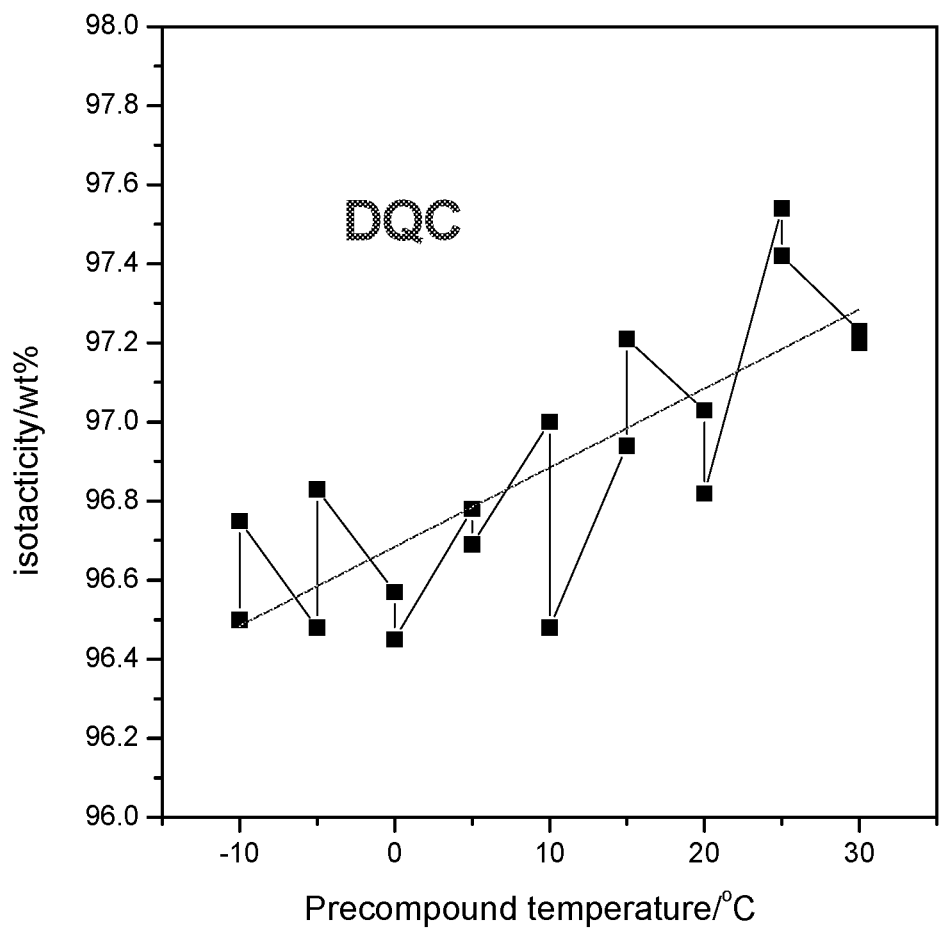
FIG. 4b depicts a plot of isotacticity versus pre-contact temperature for catalyst A.
Figure 4C:
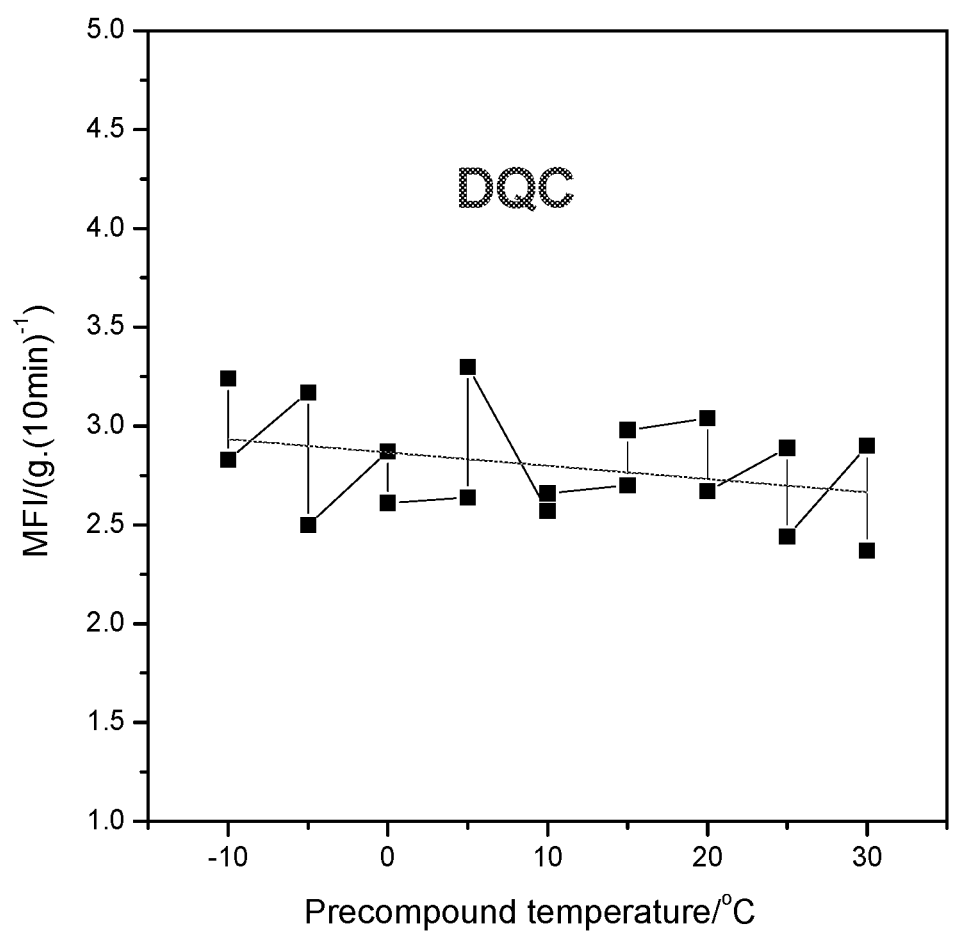
FIG. 4c depicts a plot of melt flow index versus pre-contact temperature for catalyst A.
Figure 5A:
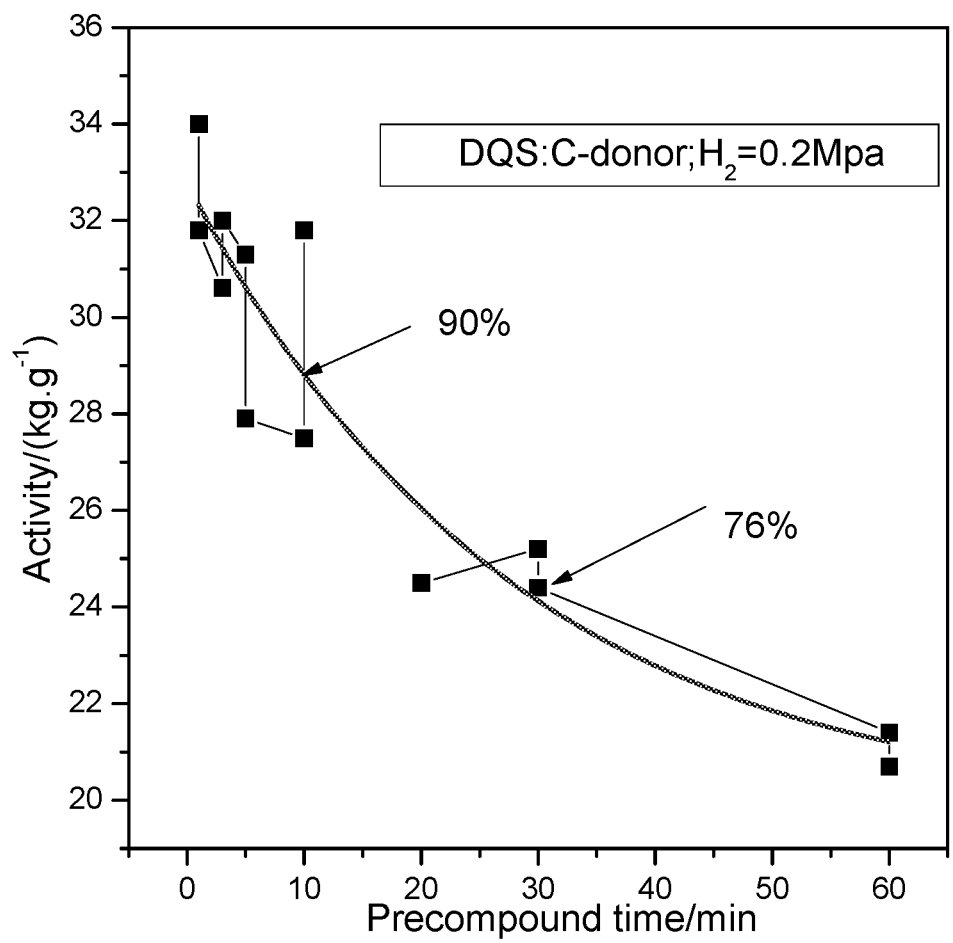
FIG. 5a depicts a plot of activity versus pre-contact temperature for catalyst C.
Figure 5B:
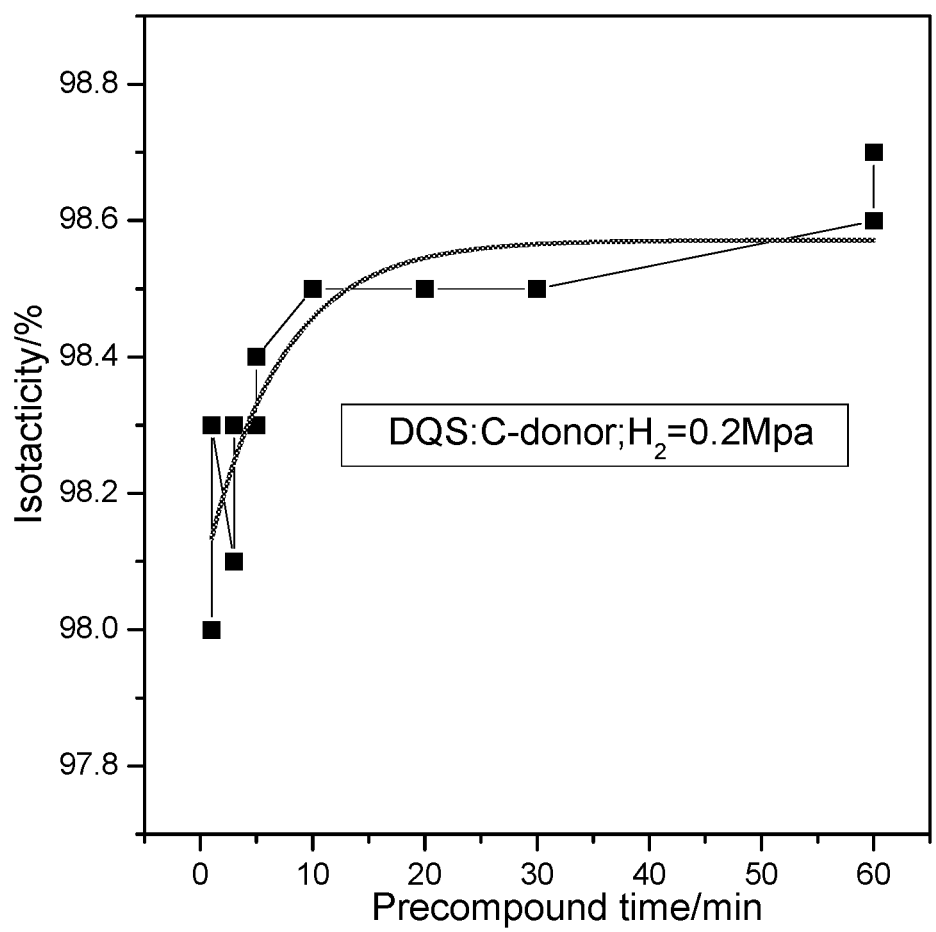
FIG. 5b depicts a plot of isotacticity versus pre-contact temperature for catalyst C.
Figure 5C:
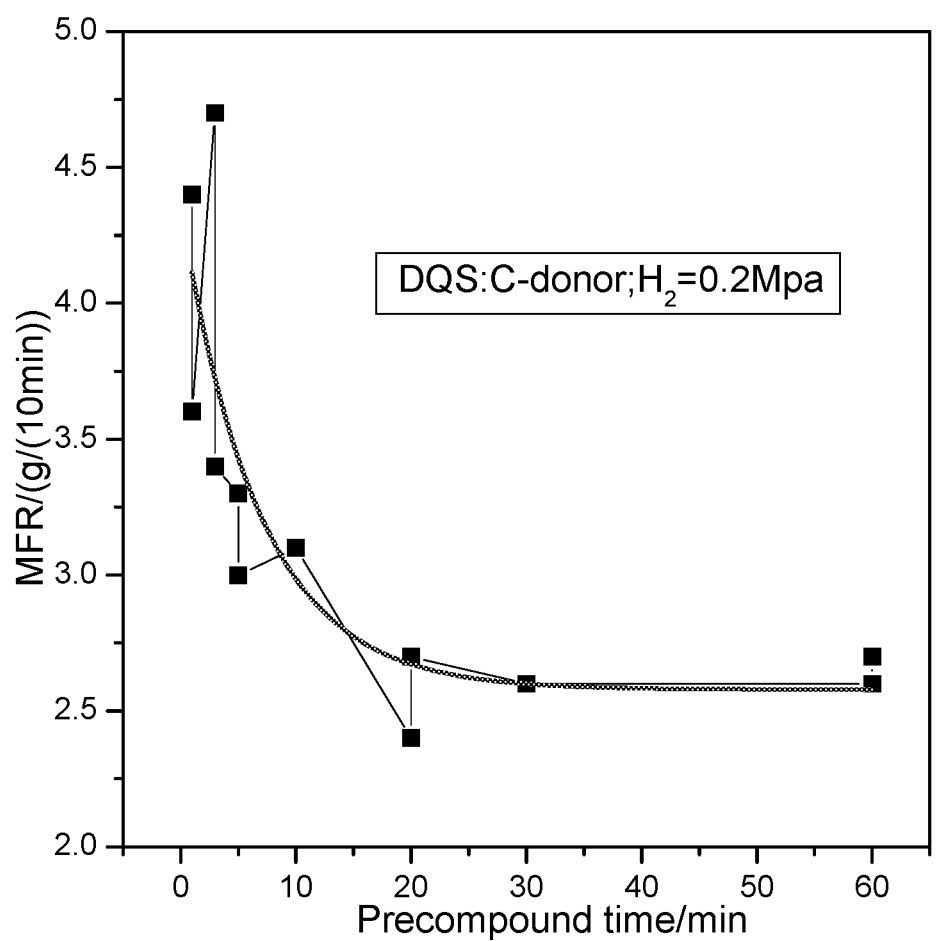
FIG. 5c depicts a plot of melt flow index versus pre-contact temperature for catalyst C.
Figure 6A:
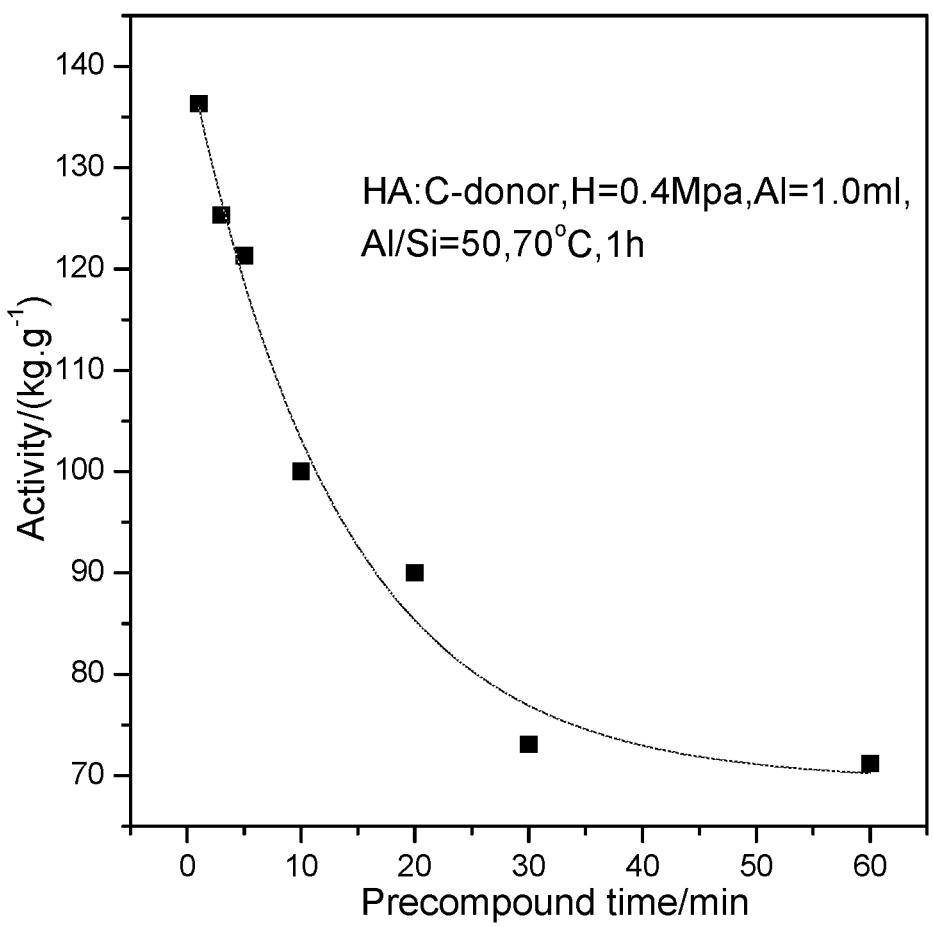
FIG. 6a depicts a plot of activity versus pre-contact temperature for catalyst B.
Figure 6B:
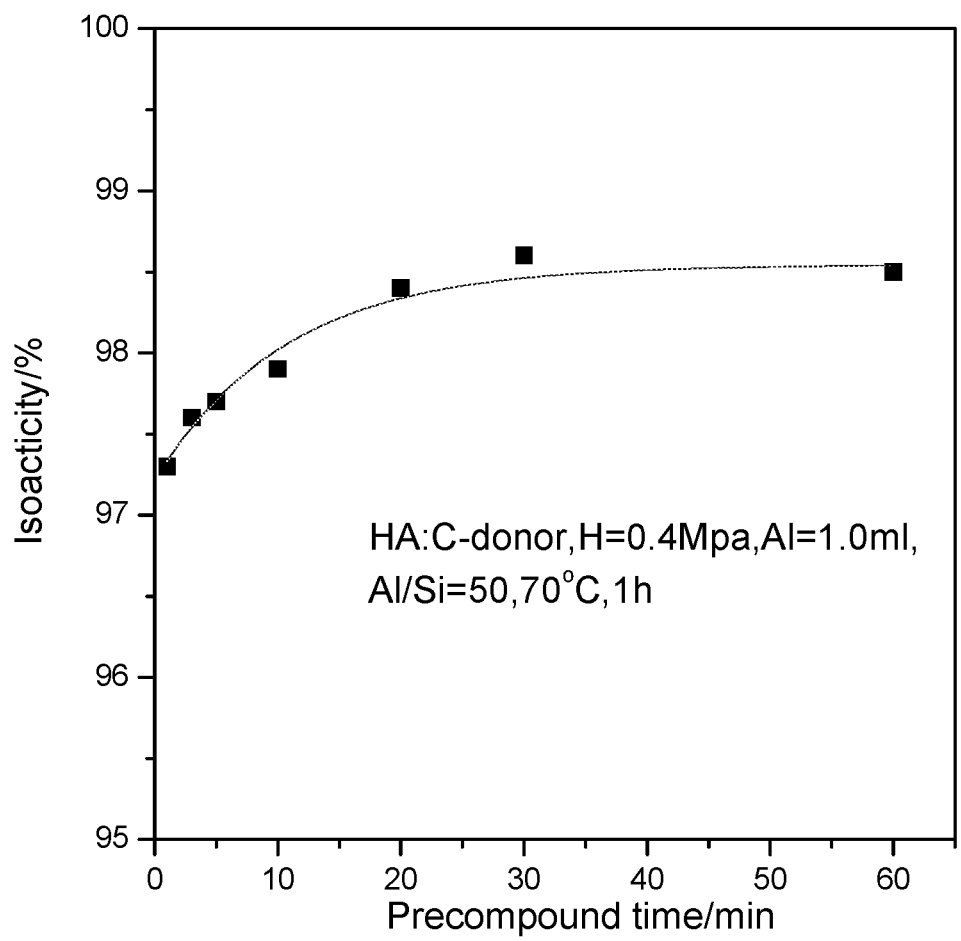
FIG. 6b depicts a plot of isotacticity versus pre-contact temperature for catalyst B.
Figure 6C:
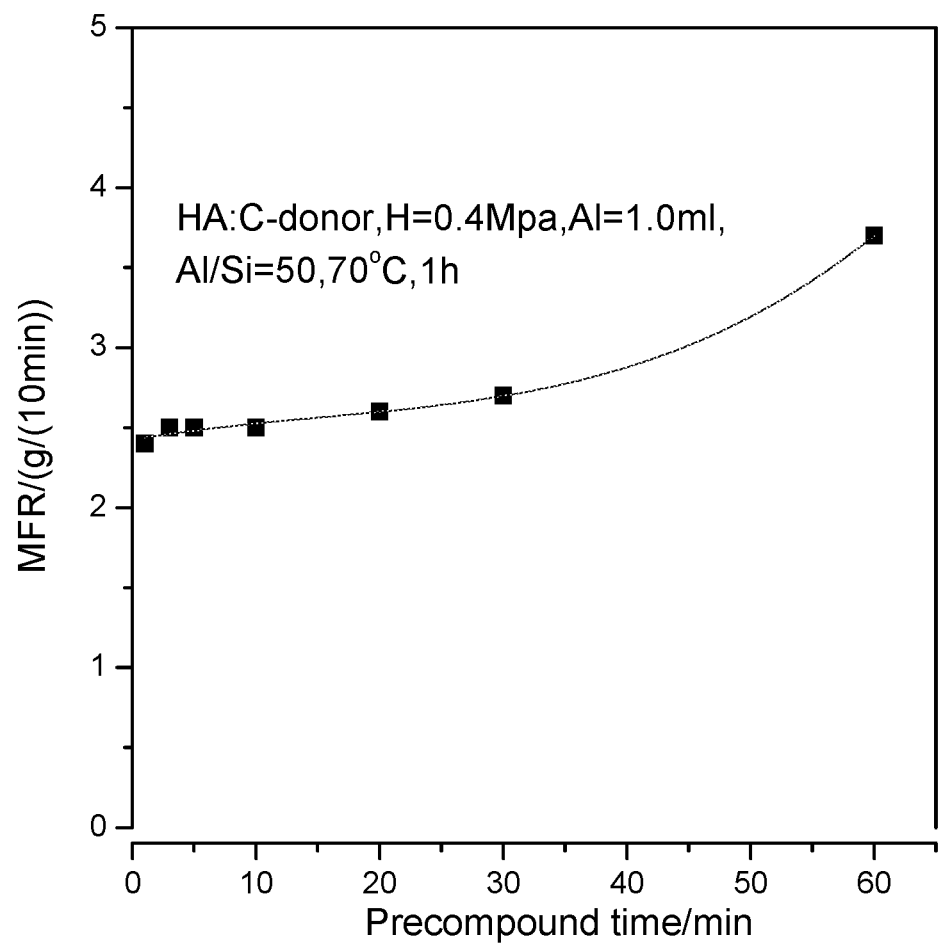
FIG. 6c depicts a plot of melt flow index versus pre-contact temperature for catalyst B.
Figure 7A:
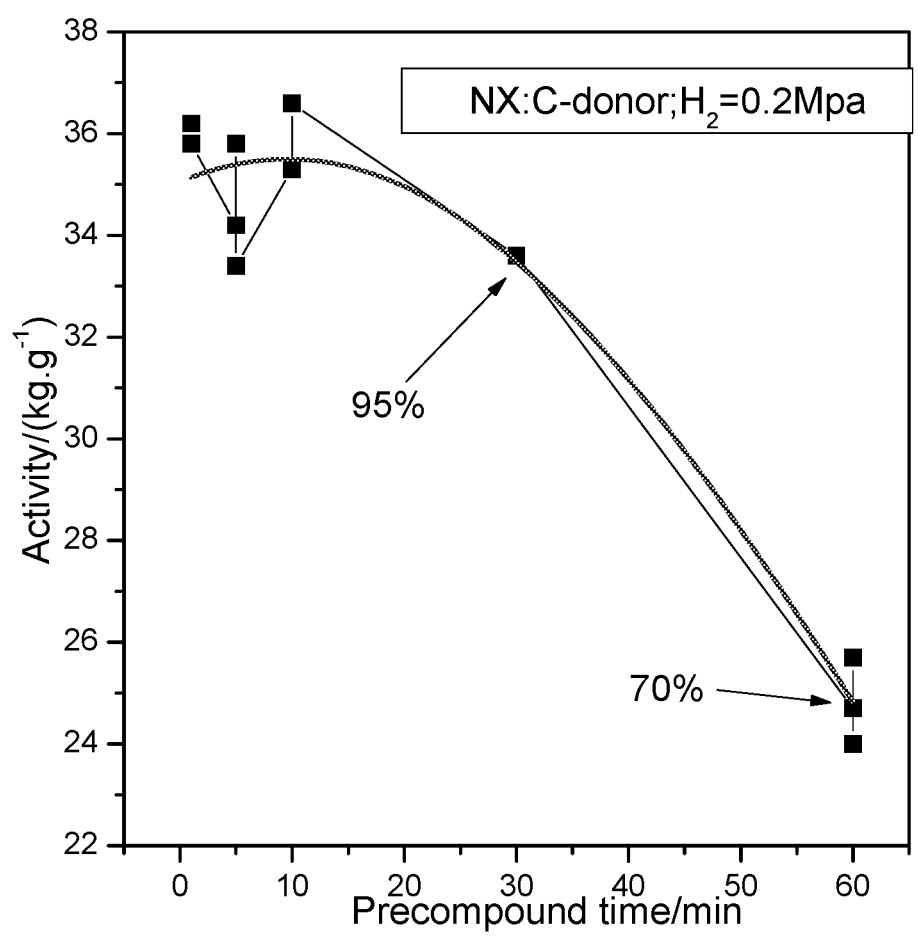
FIG. 7a depicts a plot of activity versus pre-contact temperature for catalyst D.
Figure 7B:
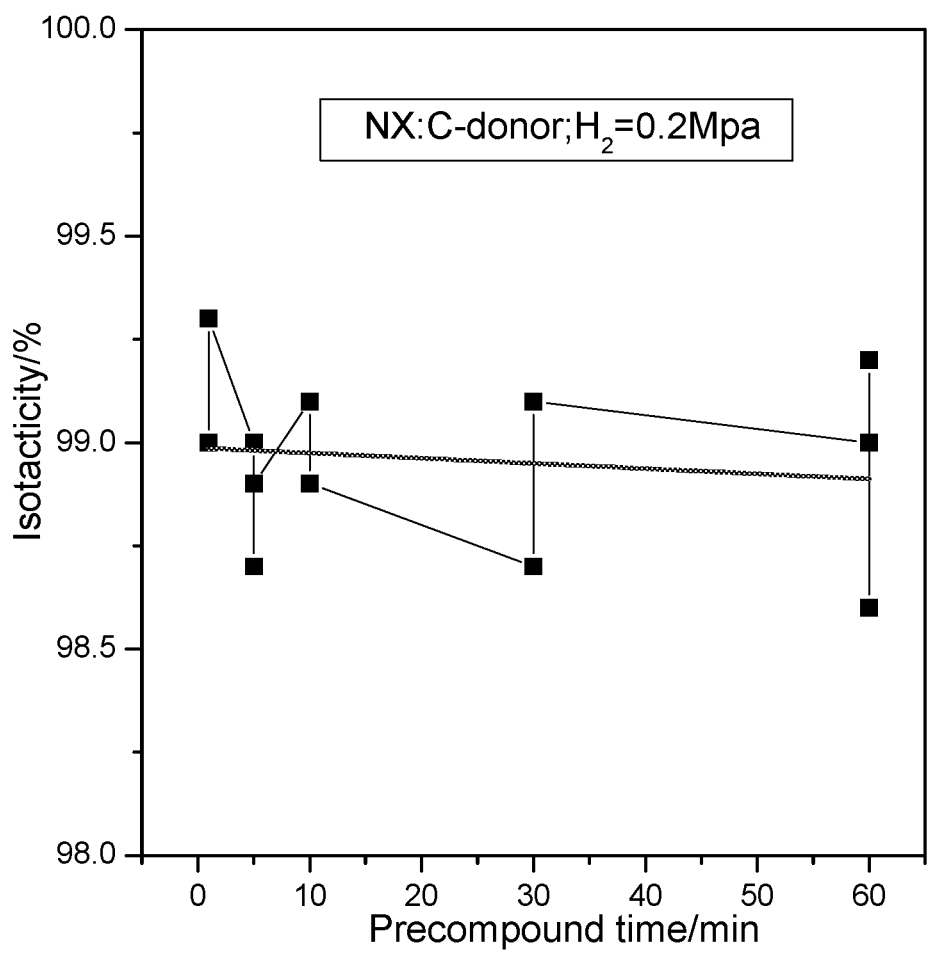
FIG. 7b depicts a plot of isotacticity versus pre-contact temperature for catalyst D.
Figure 7C:
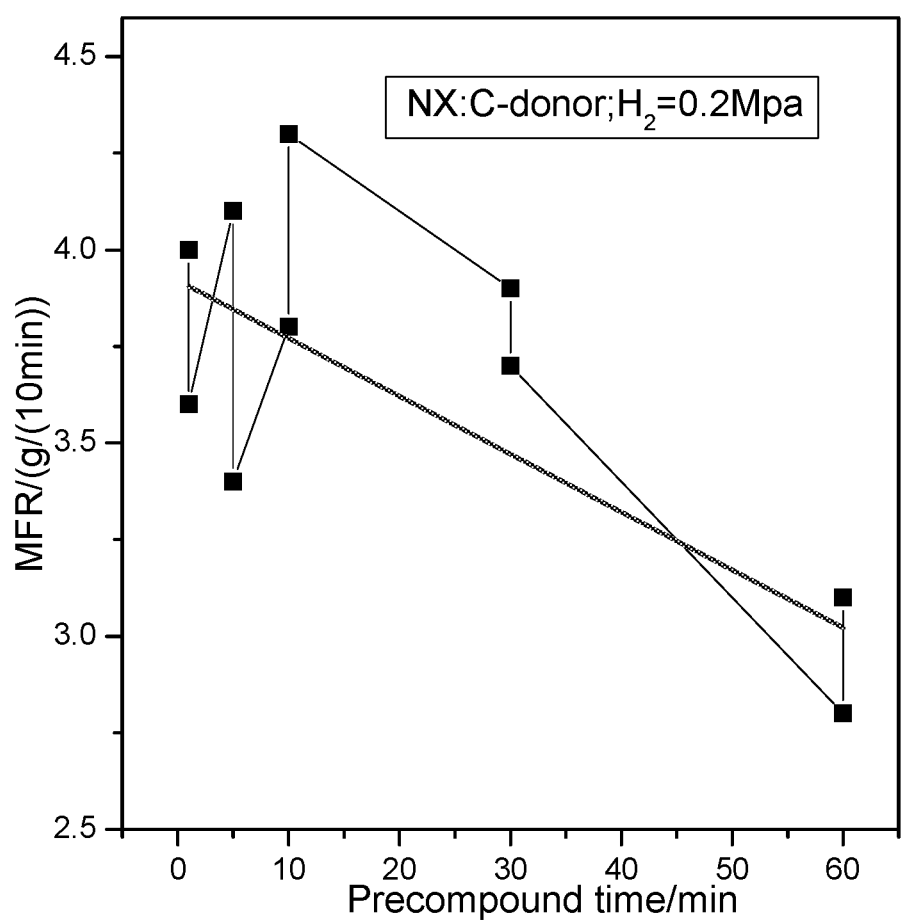
FIG. 7c depicts a plot of melt flow index versus pre-contact temperature for catalyst D.
Figure 8A:
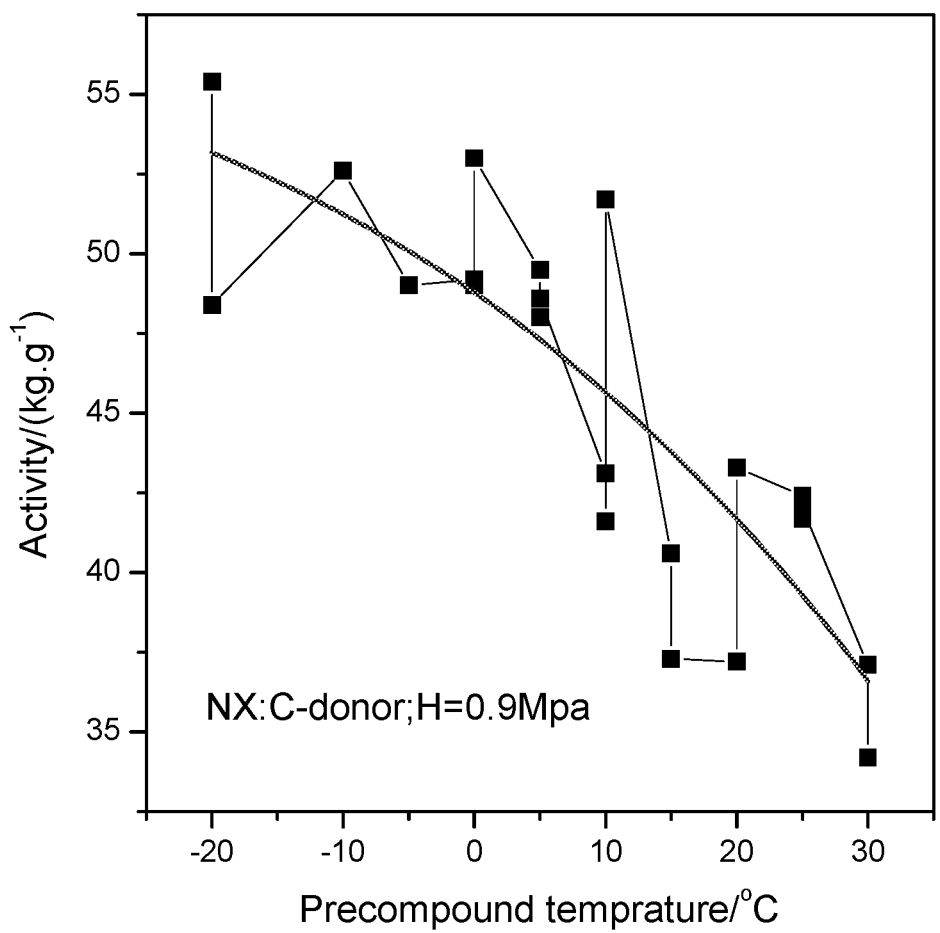
FIG. 8a depicts a plot of activity versus pre-contact temperature for catalyst D.
Figure 8B:
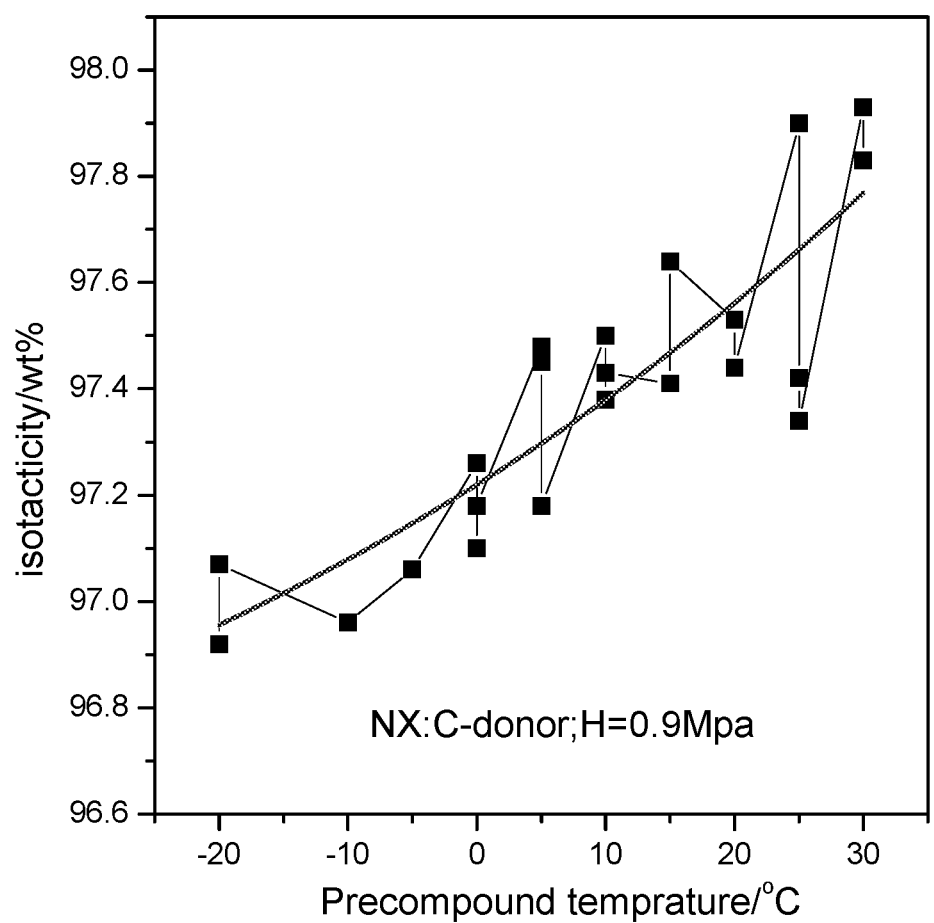
FIG. 8b depicts a plot of isotacticity versus pre-contact temperature for catalyst D.
Figure 8C:
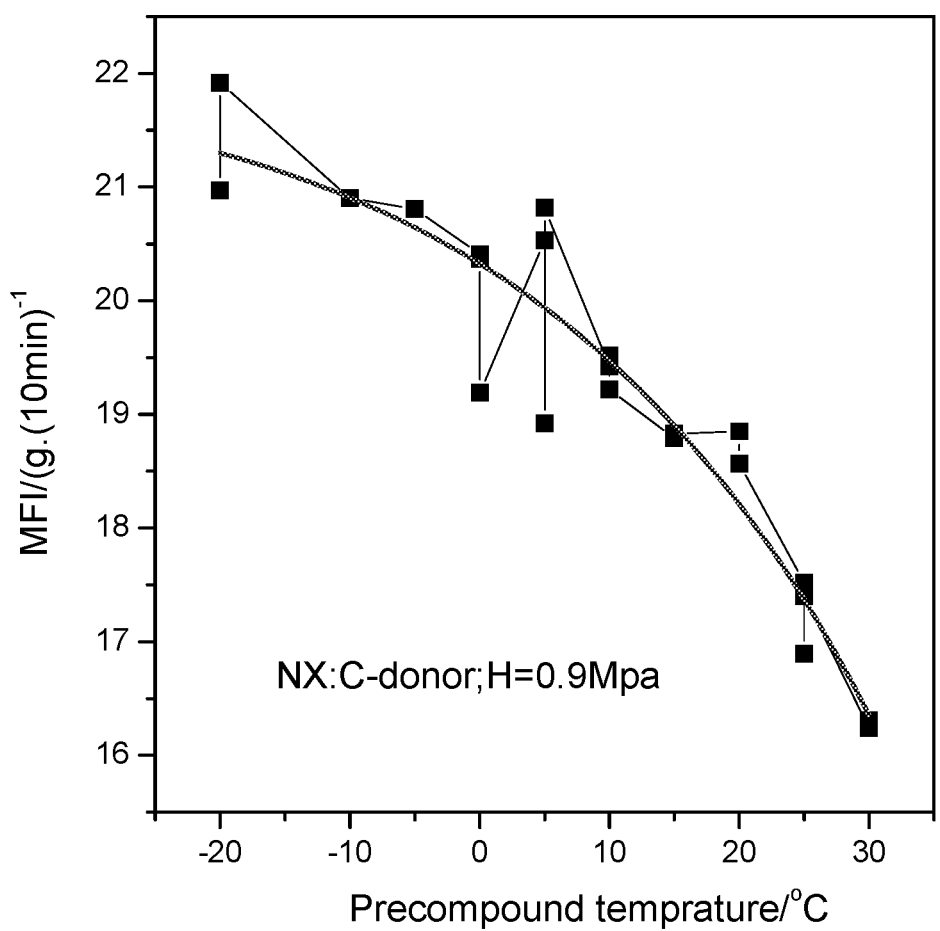
FIG. 8c depicts a plot of melt flow index versus pre-contact temperature for catalyst D.

FIG. 3 depicts a catalyst pre-contact device in accordance with an embodiment of this aspect of the invention, wherein 1 represents the catalyst pre-contact coil, 2 represents a thermostatic bath, and a, b, c, d, e and f represent valved inlets. The catalyst enters at the beginning of the catalyst pre-contact coil and combines with the cocatalyst and the optional external electron donor entering from one of the inlets a, b, c, d, e and f, whereby the pre-contact is conducted in the coil at a controlled temperature, and the pre-contacted catalyst is then passed to a downstream unit (i.e., prepolymerization unit or polymerization unit). The pre-contact time of the catalyst components can be adjusted by selecting an inlet for introducing the cocatalyst and the optional external electron donor.

In some embodiments, the catalyst pre-contact coil is an internally polished coil.

In the invention, the catalyst pre-contact coil may be of any shape that ensures no dead angle in the coil, thereby allowing the components of the catalyst to pass through smoothly. In a preferred embodiment, the catalyst pre-contact coil is of spring shape. In another preferred embodiment, the catalyst pre-contact coil is a serpentine tube.

In the invention, there is no particular limitation to the placing manner of the catalyst pre-contact coil, as long as the smooth flow of the catalyst components can be ensured. For example, the catalyst pre-contact coil can be placed horizontally, vertically, or at any other angle, while ensuring the smooth flow of the catalyst components.

The catalyst pre-contact coil is provided with at least two valved inlets. There is no particular limitation to the upper limit of the number of the inlets, and the upper limit is mainly determined by the requirements of the polymerization process and the convenience of equipment processing. For example, the catalyst pre-contact coil can be provided with from 2 to about 20, and preferably from 2 to about 10 valved inlets.

The valved inlets can be provided anywhere in the catalyst pre-contact coil. An arrangement of the inlets is schematically depicted in FIG. 3. As shown in FIG. 3, according to the flow direction of the materials, the inlets can be provided at the beginning of the coil (inlet a) and further anywhere in the middle of the coil (inlets b, c, d and e). In addition, a valved inlet may be further provided at the outlet line at the end of the coil (inlet f), in which case the materials from the two feeding pipelines are combined at the inlet f and directly enter the outlet line to conduct the catalyst pre-contact, then enter the downstream unit.

According to an embodiment of the invention, the catalyst pre-contact device is tailored to the process requirements, wherein the number and position of the valved inlets can be freely set according to the desired pre-contact time of materials used for the continuous olefin polymerization process. For example, in a particular continuous olefin polymerization process where the desired pre-contact time of three-agents has been determined, one valved inlet is provided at a corresponding location on the coil; in other continuous olefin polymerization processes where, in consideration of different aspects (for example, catalyst activity, polyolefin isotactic index or melt index, etc.), it is necessary to adjust the pre-contact time of three-agents to meet different requirements, one or more valved inlets are provided at the corresponding locations on the coil.

According to another embodiment of this aspect of the invention, the catalyst pre-contact device includes a catalyst pre-contact coil provided with a plurality of valved inlets, wherein the plurality of valved inlets are provided on the catalyst pre-contact coil at substantially equal intervals from the beginning of the catalyst pre-contact coil. In a particular application, a particular inlet for introducing the cocatalyst and the optional external electron donor is selected as desired so that the actual catalyst pre-contact time is as close as possible to the determined desired catalyst pre-contact time.

The catalyst pre-contact coil may generally have a diameter of from 3 to 30 mm. The total length of the catalyst pre-contact coil can be determined based on the maximum residence time of the three-agents passing through the conduit. In general, the catalyst pre-contact coil has such a total length that a maximum residence time in the conduit of the materials used for the continuous olefin polymerization process is from 50 to 70 minutes. In addition, the total length of the catalyst pre-contact coil can be extended to increase the pre-contact time of three-agents if required by the process.

In the invention, the catalyst pre-contact device further comprises a temperature controlling means, and the temperature controlling means can be selected with reference to the prior art.

According to a preferred embodiment, the catalyst pre-contact device further comprises a thermostatic bath, with the catalyst pre-contact coil being located within thermostatic bath, and the control of the temperature of the materials in the pre-contact coil is achieved through the thermostatic medium in the thermostatic bath.

According to another preferred embodiment, a jacket is provided outside the catalyst pre-contact coil, i.e., the catalyst pre-contact coil is a jacketed coil. The thermostatic medium flows in the jacket to control the pre-contact temperature of the three-agents. Here, the flow directions of the thermostatic medium and the three-agents may be the same or opposite. Preferably, the thermostatic medium and the three-agents flow reversely.

Preferably, the catalyst pre-contact coil is further provided with a pipeline mixer for mixing materials from individual feeding line. When the inlet of the coil is located at the terminus (for example, at f as shown in FIG. 3), the pipeline mixer can be located at the confluence of the three-way outlet line.

The pipeline mixer may be selected from various pipeline mixers commercially used, and specific examples thereof include, but are not limited to, nozzle type pipeline mixers, vortex pipeline mixers, profile pipeline mixers or static pipeline mixers, and the like. Among these, the static pipeline mixers may be selected from the group consisting of SV type static pipeline mixers, SK type static pipeline mixers, SX type static pipeline mixers, SH type static pipeline mixers or SL type static pipeline mixers, and the like.

According to a preferred embodiment, the pipeline mixer is selected from SK-type static pipeline mixers.

The catalyst pre-contact device may comprise one or more catalyst pre-contact coil. According to an embodiment, the catalyst pre-contact device comprises more than two sets of catalyst pre-contact coils connected in parallel. Such a design can allow adjustment of the pre-contact time and/or pre-contact temperature of the three-agents over a wider range and allows at least one catalyst pre-contact coil to be used as a backup.

In a fifth aspect, the invention provides a catalyst pre-contact device comprising a plurality of mini catalyst pre-contact tanks in series. Each of the catalyst pre-contact tanks is provided with a temperature adjustable jacket for controlling the pre-contact temperature of the three-agents. The volume of each mini catalyst pre-contact tank is such that the average residence time in the tank of the materials for the olefin continuous polymerization process is less than about 10 minutes, such as less than about 5 minutes, such as in the range of from 0.1 to 4 minutes or in the range of from 0.2 to 3 minutes. Additionally, the catalyst pre-contact tank is equipped with a stirring system. Further details of the catalyst pre-contact tank can be found in the description of the catalyst pre-contact tank in the catalyst pre-contact device according to the second aspect of the invention.

According to this aspect of the invention, the main catalyst, the cocatalyst and the optional external electron donor may pass through one or more of the catalyst pre-contact tanks in series and then enter a subsequent prepolymerization unit or polymerization device, whereby the pre-contact time is controlled.

An advantage of the catalyst pre-contact device according to this aspect of the invention is that the settling and non-uniformization of the catalyst composition during the pre-contact process can be prevented because of the provision of a stirring means in each of the mini catalyst pre-contact tanks.

The catalyst pre-contact device of the invention can be widely applied to various olefin polymerization processes, particularly liquid phase bulk-gas phase propylene polymerization processes such as the Spheripol process of LyondellBasell, the Hypol process of Mitsui Chemicals Co., Ltd., Borstar process of Borealis, etc., gas phase propylene polymerization processes such as Unipol polyolefin process, Inovene polypropylene process, Novolen polypropylene process, etc., which are well known in the art. Processes for the polymerization of ethylene or other olefins have also been contemplated.

In the invention, the downstream unit refers to a prepolymerization system (when present) or a primary polymerization system (when no prepolymerization system is present) in a conventional olefin continuous polymerization process. In order to more precisely control the temperature and time of the pre-contact, the catalyst pre-contact device is as close as possible to the prepolymerization or primary polymerization system in actual installation.

Optionally, an inlet for introducing an inert gas or an inert solvent as needed may be added to the outlet line of the catalyst pre-contact tank, the catalyst pre-contact coil, and/or the feeding lines for individual catalyst components. The inert gas is used to purge the system, specific examples of which include, but are not limited to, nitrogen or argon; the inert solvent is used to clean the system or the like, which may be selected from hexane, heptane, and the like. The pressure of the inert gas or inert solvent should be greater than the pressure inside the downstream unit.

According to the method of the invention, both the pre-contact time of the components of the catalyst and the catalyst pre-contact temperature can be adjusted. In addition, the method can avoid the back-mixing of the pre-contacted materials and has the characteristics of low equipment investment.

In various continuous polymerization processes of olefins, the pre-contact temperature and pre-contact time of the catalyst can be adjusted by using the catalyst pre-contact device of the invention, so that the performance of the catalyst reaches a superior level according to a specific process. Moreover, the catalyst pre-contact device of the invention has a wide adjusting range, and the contact of the individual streams is substantially carried out in the form of a plug flow, which can keep the pre-contact time of the catalyst uniform and avoid the back-mixing of three-agents having different pre-contact time encountered by the existing polymerization processes. The catalyst pre-contact device is compact and efficient, and the retrofitting of existing polymerization plants is simple, without requiring excessive control and operation.

The invention is to be described in detail with reference to specific examples, which are to be construed as illustrative and not limiting.

Methods for preparing catalysts used in the examples are as follows:

Catalyst A:

To a 300 ml glass reactor equipped with a stirrer, in which reactor air had been fully replaced with high pure $N_2$, was charged with 100 ml of titanium tetrachloride, and the contents were cooled to $-20°$ C. To the reactor was added 8 g of spherical magnesium dichloride-alcohol adduct carrier (having a molar ratio of ethanol to magnesium dichloride of 2.62 and being prepared according to Example 1 of Chinese patent application CN1330086A). The contents were stage-wise and slowly heated to 110° C., with 3.9 ml of dibutyl phthalate being added thereto during the heating. The contents were maintained at 110° C. for further 0.5 hours to afford solid precipitants. Liquid was filtered off, and solids were treated with titanium tetrachloride twice (2×100 ml), washed with hexane five times and dried under vacuum, to give a titanium-containing solid catalyst component A (main catalyst).

Catalyst B:

To a 300 ml glass reactor equipped with a stirrer, in which reactor air had been fully replaced with high pure $N_2$, were charged with 90 ml of titanium tetrachloride and 10 ml of hexane, and the contents were cooled to $-20°$ C. To the reactor was added 8 g of spherical magnesium dichloride-alcohol adduct carrier (having a molar ratio of ethanol to magnesium dichloride of 2.62 and being prepared according to Example 1 of Chinese patent application CN1330086A). Next, the contents were stage-wise and slowly heated to 40°

C. with stirring, and then 4.9 mmol of 2,4-pentandiol dibenzoate and 4.5 mmol of 2-isoamyl-2-isopropyl-1,3-dimethoxy propane were added thereto. The contents were continuously heated to 110° C. and maintained at that temperature for 0.5 hours, and then the liquid was filtered off. The residual solids were treated with titanium tetrachloride (100 ml) at 110° C. for 1 hour. The titanium tetrachloride treatment was repeated three times. Next, the resultant solids were washed with hexane five times and dried under vacuum, to give a slid catalyst component A (main catalyst).

Catalyst C:

1. Preparation of Spherical Magnesium Chloride Adduct

To a 500 ml reactor were successively charged with 150 ml of dimethyl silicone oil, 30 g of magnesium chloride, 50 ml of ethanol and 9 ml of dimethoxy propane. The mixture was heated to 125° C. while stirring and maintained at that temperature for 2 hours. Then the mixture was discharged under pressure into octylphenolpolyoxyethylene (10) ether/dimethyl silicone oil (1.5 ml/350 ml) preheated to 115° C., and dispersed by stirring at high speed for 30 minutes. Then, the resultant mixture was discharged under nitrogen gas pressure into 2 L of hexane which was previously cooled to −30° C., the liquid was filtered off, and the solids were washed 5 times with hexane and dried under vacuum to afford a spherical magnesium chloride adduct. The average particle diameter (D50) was 45.2 m, and the particle size distribution value SPAN ((D90−D10)/D50) was 0.96.

2. Preparation of Spherical Catalyst Component

To a 300 ml glass reactor were charged with 90 ml of titanium tetrachloride and 10 ml of hexane, and the contents were cooled to −20° C. 8 g of spherical carrier prepared above was added to the reactor, and the contents were heated to 110° C., with 1.5 ml of di-isobutyl phthalate (DIBP) being added thereto during the heating. Liquid was filtered off, and solids were washed with titanium tetrachloride twice and with hexane three times and dried under vacuum, to give the spherical catalyst component.

Catalyst D:

To a reactor, in which air had been sufficiently replaced with high pure $N_2$, were charged successively with 4.8 g of magnesium dichloride, 70 ml of toluene, 4 ml of epoxy chloropropane, 12.5 ml of tributyl phosphate (TBP), and 1.0 ml of tatraethoxysilane. The contents were heated to 60° C. and maintained at that temperature for 1.0 hours with stirring. The solids were completely dissolved. 1.4 g of phthalic anhydride and 30 ml of toluene were added and the mixture was maintained for 1 hour. The solution was cooled to below −28° C., and 56 ml of $TiCl_4$ (5 ml/min) was added dropwise over 1 hour, and the temperature was slowly raised to 85° C. (5° C./min). Solids were gradually precipitated during the temperature increase. Next, 1.1 ml of di-n-butyl phthalate was added and the contents were maintained at 85° C. for 1 hour. After filtration, the solids were washed twice with toluene to obtain solid precipitates. Then, 72 ml of toluene and 48 ml of $TiCl_4$ were added, and the temperature was raised to 110° C. to conduct the treatment for 0.5 hour. After liquid was filtered off, solids were washed five times with hexane, and dried under vacuum to give a solid catalyst component.

Example 1

This example compares the results obtained with catalyst pre-contact and without catalyst pre-contact.

In the experiment with catalyst pre-contact, the catalyst pre-contact device used is as shown in FIG. 2, including a catalyst pre-contact tank 1, a catalyst pre-contact coil 2 and a thermostatic bath 3, wherein the catalyst pre-contact tank 1 is a 50 ml stirred-tank equipped with a three-bladed inclined-paddle agitator, and the temperature inside the stirred-tank is controlled by a thermostatic medium in the jacket; the catalyst pre-contact coil 2 is provided with inlets a, b, c, d, e and f, and the temperature inside the catalyst pre-contact coil 2 is controlled by a thermostatic medium in the thermostatic bath 3. The temperature inside the catalyst pre-contact tank was controlled by the thermostatic medium to 10° C., and the time over which the main catalyst, the cocatalyst and the electron donor passed through the catalyst pre-contact device was controlled to be less than 1 minute. That is, immediately after the main catalyst, the cocatalyst, and the electron donor were combined and stirred in the catalyst pre-contact tank (total contact time was less than 1 minute), they were lead to the inlet f and passed through the line to the subsequent polymerization step.

In the experiment without catalyst pre-contact, the main catalyst, the cocatalyst and the electron donor were introduced separately and directly into the polymerization vessel.

The main catalyst was the above Catalyst B or D. A liquid phase bulk process was used to conduct the propylene polymerization, wherein hydrogen concentration was 500 ppm; a molar ratio of cocatalyst (triethylaluminum) and electron donor (methyl cyclohexyl dimethoxysilane) in terms of Al/Si was controlled to be 25, and Al/Ti molar ratio was controlled to be 300. Polymerization temperature was 70° C., and polymerization residence time was 60 min. Polymerization tank stirring speed was controlled at 500 rpm. The obtained experimental results are shown in Table 1.

TABLE 1

| Catalyst | Catalyst Feeding Manner | Catalyst Activity kgPP/g · Cat | Polymer Isotactic Index wt % | Polymer Melt Index g/10 min | Hydrogen Concentration ppm |
|---|---|---|---|---|---|
| Catalyst B | Pre-contact | 107.3 | 98.9 | 2.1 | 500 |
|  | No pre-contact | 100.2 | 98.0 | 0.7 | 500 |
| Catalyst D | Pre-contact | 48.0 | 97.5 | 22.1 | 2500 |
|  | No pre-contact | 40.4 | 96.9 | 21.1 | 2500 |

It can be seen from the results in the above table that the catalyst pre-contact may improve and enhance polymerization activity, isotactic index and melt index of the catalysts.

Examples 2-16

These examples are used to illustrate the catalyst pre-contact method according to the invention.

In these examples, the catalyst pre-contact device used is as shown in FIG. 2, including a catalyst pre-contact tank 1, a catalyst pre-contact coil 2 and a thermostatic bath 3, wherein the catalyst pre-contact tank 1 is a 50 ml stirred-tank equipped with a three-bladed inclined-paddle agitator, and the temperature inside the stirred-tank is controlled by a thermostatic medium in the jacket; the catalyst pre-contact coil 2 is provided with inlets a, b, c, d, e and f, and the temperature inside the catalyst pre-contact coil 2 is controlled by a thermostatic medium in the thermostatic bath 3.

The main catalyst was the above Catalyst C. A liquid phase bulk process was used to conduct the propylene polymerization, wherein hydrogen concentration was 500 ppm or 2500 ppm; a molar ratio of cocatalyst (triethylaluminum) and electron donor (methyl cyclohexyl dimethoxysilane) in terms of Al/Si was controlled to be 25, and Al/Ti molar ratio was controlled to be 300. Polymerization temperature was 70° C., and polymerization residence time was 60 min. Polymerization tank stirring speed was controlled at 500 rpm.

In Example 2 using the above catalyst pre-contact device, the temperature inside the catalyst pre-contact tank and the catalyst pre-contact coil was controlled by the thermostatic medium to 10° C., and the time over which the main catalyst, the cocatalyst and the electron donor passed through the catalyst pre-contact device was controlled to be less than 1 minute. That is, immediately after the main catalyst, the cocatalyst, and the electron donor were combined and stirred in the catalyst pre-contact tank (total contact time was less than 1 minute), they were lead to the inlet f and passed through the line to the subsequent polymerization step. The amount of hydrogen added during the polymerization was 500 ppm. The experimental results obtained are shown in Table 1.

Examples 3-7 were carried out in the same manner as Example 2, except that the pre-contact time of the main catalyst, the cocatalyst and the external electron donor was controlled to be 5 minutes, 10 minutes, 20 minutes, 30 minutes, 60 minutes, respectively (i.e., the corresponding inlet valve was opened, and the remaining inlet valves were closed) and, after pre-contacting with each other, the three-agents were introduced into the subsequent polymerization step. The experimental results obtained are shown in Table 2.

Examples 8-16 were carried out in the same manner as Example 2, except that the materials from the catalyst contact tank were introduced into the pre-contact coil through the c inlet and then into the polymerization unit, thereby controlling the pre-contact time of the main catalyst, the cocatalyst and the electron donor passing through the catalyst pre-contact device to be about 30 minutes, and the temperature of both the catalyst pre-contact tank and the catalyst pre-contact coil was controlled by the thermostatic medium to be −10° C., −5° C., −0° C., 5° C., 10° C., 15° C., 20° C., 25° C. and 30° C., respectively. The amount of hydrogen added during the polymerization was 2,500 ppm. The experimental results obtained are shown in Table 3.

TABLE 2

Polymerization results using Catalyst C

| No. | Pre-contact Time min | Catalyst Activity kgPP/g · Cat | Polymer Isotactic Index wt % | Melt Index g/10 min |
|---|---|---|---|---|
| Example 2 | <1 | 31.8 | 98.3 | 3.6 |
| Example 3 | 5 | 31.3 | 98.4 | 3.3 |
| Example 4 | 10 | 31.8 | 98.5 | 3.1 |
| Example 5 | 20 | 24.5 | 98.5 | 2.7 |
| Example 6 | 30 | 24.4 | 98.5 | 2.6 |
| Example 7 | 60 | 21.4 | 98.7 | 2.6 |

It can be seen from Table 2 that, as the pre-contact time of the catalyst, the cocatalyst and the electron donor increase, polymerization activity of the catalyst gradually decreases, the resultant polymer isotactic index increases, and melt index decreases.

TABLE 3

Polymerization results using Catalyst C

| No. | Pre-contact Temperature ° C. | Catalyst Activity kgPP/g · Cat | Polymer Isotactic Index wt % | Melt Index g/10 min |
|---|---|---|---|---|
| Example 8 | −10 | 38.1 | 96.5 | 40.3 |
| Example 9 | −5 | 38.2 | 96.7 | 32.1 |
| Example 10 | 0 | 36.5 | 96.5 | 41.4 |
| Example 11 | 5 | 41.1 | 96.7 | 33.6 |
| Example 12 | 10 | 38.9 | 96.8 | 25.5 |
| Example 13 | 15 | 35.6 | 96.8 | 27.9 |
| Example 14 | 20 | 34.0 | 97.1 | 26.5 |
| Example 15 | 25 | 31.5 | 97.5 | 23.5 |
| Example 16 | 30 | 29.4 | 97.5 | 23.9 |

It can be seen from Table 2 that, as the pre-contact temperature of the catalyst, the cocatalyst and the electron donor increases, polymerization activity of the catalyst gradually increases and then gradually decreases after reaching a certain value, the resultant polymer isotactic index increases, and melt index decreases.

Taking into account the results in Tables 2 and 3, it can be determined that for the above Catalyst C, the desired pre-contact temperature is from about −10 to about 5° C., and the desired pre-contact time is less than about 10 minutes.

Example 17

The influence of the pre-contact time and the pre-contact temperature on the polymerization results was examined by using the above Catalyst A and using the polymerization method and conditions described in Examples 2-16. Results are shown in Tables 4 and 5 below.

TABLE 4

Influence of pre-contact time on polymerization results

| Run No. | Pre-contact Time* min | Polymerization Activity kgPP/gCat | Isotactic Index % | Melt Index g/10 min |
|---|---|---|---|---|
| 1 | 1 | 38.3 | 97.0 | 3.0 |
| 2 | 3 | 36.7 | 97.4 | 3.0 |
| 3 | 5 | 34.6 | 97.3 | 3.3 |
| 4 | 10 | 29.2 | 97.2 | 2.7 |
| 5 | 20 | 27.3 | 97.6 | 2.5 |
| 6 | 30 | 22 | 97.5 | 2.4 |
| 7 | 60 | 21.6 | 97.6 | 2.6 |

*Pre-contact temperature was 10° C.

TABLE 5

Influence of pre-contact temperature on polymerization results

| Run No. | Pre-contact Temperature* ° C. | Polymerization Activity kgPP/gCat | Isotactic Index % | Melt Index g/10 min |
|---|---|---|---|---|
| 8 | −10 | 29.0 | 96.50 | 3.24 |
| 9 | −10 | 31.2 | 96.75 | 2.83 |
| 10 | −5 | 27.2 | 96.48 | 3.17 |
| 11 | −5 | 29.9 | 96.83 | 2.5 |

TABLE 5-continued

Influence of pre-contact temperature on polymerization results

| Run No. | Pre-contact Temperature* ° C. | Polymerization Activity kgPP/gCat | Isotactic Index % | Melt Index g/10 min |
|---|---|---|---|---|
| 12 | 0 | 28.2 | 96.57 | 2.87 |
| 13 | 0 | 26.5 | 96.45 | 2.61 |
| 14 | 5 | 29.2 | 96.78 | 2.64 |
| 15 | 5 | 26.0 | 96.69 | 3.30 |
| 16 | 10 | 25.3 | 97.0 | 2.57 |
| 17 | 10 | 26.8 | 96.48 | 2.66 |
| 18 | 15 | 24.1 | 96.94 | 2.7 |
| 19 | 15 | 28.6 | 97.21 | 2.98 |
| 20 | 20 | 24.0 | 97.03 | 3.04 |
| 21 | 20 | 23.6 | 96.82 | 2.67 |
| 22 | 25 | 25.1 | 97.54 | 2.89 |
| 23 | 25 | 22.9 | 97.42 | 2.44 |
| 24 | 30 | 21.5 | 97.23 | 2.90 |
| 25 | 30 | 20.2 | 97.20 | 2.37 |

*Pre-contact time: 30 min

Example 18

The influence of the pre-contact time on the polymerization results was examined by using the above Catalyst B and using the polymerization method and conditions described in Examples 2-16. Results are shown in Table 6 below.

TABLE 6

Influence of pre-contact time on polymerization results

| Run No. | Pre-contact Time min | Polymerization Activity kgPP/gCat | Isotactic Index % | Melt Index g/10 min |
|---|---|---|---|---|
| 1 | 1 | 136.3 | 97.3 | 2.4 |
| 2 | 3 | 125.3 | 97.6 | 2.5 |
| 3 | 5 | 121.3 | 97.7 | 2.5 |
| 4 | 10 | 100.0 | 97.9 | 2.5 |
| 5 | 20 | 90.0 | 98.4 | 2.6 |
| 6 | 30 | 73.1 | 98.6 | 2.7 |
| 7 | 60 | 71.2 | 98.5 | 3.7 |

*Pre-contact temperature was 10° C.

Example 19

The influence of the pre-contact time and pre-contact temperature on the polymerization results was examined by using the above Catalyst D and using the polymerization method and conditions described in Examples 1-15. Results are shown in Tables 7 and 8 below.

TABLE 7

Influence of pre-contact time on polymerization results

| Pre-contact Time min | Polymerization Activity kgPP/gCat | Isotactic Index % | Melt Index g/10 min |
|---|---|---|---|
| 1 | 36.2 | 99 | 4 |
| 1 | 35.8 | 99.3 | 3.6 |
| 5 | 34.2 | 99 | 4.1 |
| 5 | 35.8 | 98.7 | 3.4 |
| 5 | 33.4 | 98.9 | 3.4 |
| 10 | 35.3 | 99.1 | 3.8 |
| 10 | 36.6 | 98.9 | 4.3 |
| 30 | 33.6 | 98.7 | 3.9 |
| 30 | 33.6 | 99.1 | 3.7 |
| 60 | 24.7 | 99 | 2.8 |

TABLE 7-continued

Influence of pre-contact time on polymerization results

| Pre-contact Time min | Polymerization Activity kgPP/gCat | Isotactic Index % | Melt Index g/10 min |
|---|---|---|---|
| 60 | 25.7 | 98.6 | 3.1 |
| 60 | 24 | 99.2 | 2.8 |

*Pre-contact temperature: 10° C.

TABLE 8

Influence of pre-contact temperature on polymerization results

| Run No. | Pre-contact Temperature*, ° C. | AC | II | MI |
|---|---|---|---|---|
| 1 | −20 | 55.4 | 96.92 | 20.97 |
| 2 | −20 | 48.4 | 97.07 | 21.92 |
| 46 | −20 | 55.4 | 97.32 | 19.72 |
| 3 | −10 | 55.2 | 96.79 | 20.93 |
| 4 | −10 | 52.6 | 96.96 | 20.90 |
| 5 | −5 | 49.0 | 97.06 | 20.81 |
| 7 | 0 | 49.2 | 97.26 | 20.41 |
| 8 | 0 | 49.0 | 97.10 | 20.37 |
| 41 | 0 | 53.0 | 97.18 | 19.19 |
| 9 | 5 | 49.5 | 97.48 | 20.53 |
| 10 | 5 | 48.0 | 97.45 | 18.92 |
| 42 | 5 | 48.6 | 97.18 | 20.82 |
| 11 | 10 | 43.1 | 97.50 | 19.42 |
| 12 | 10 | 41.6 | 97.38 | 19.52 |
| 47 | 10 | 51.7 | 97.43 | 19.22 |
| 13 | 15 | 40.6 | 97.41 | 18.79 |
| 14 | 15 | 37.3 | 97.64 | 18.83 |
| 15 | 20 | 37.2 | 97.53 | 18.85 |
| 16 | 20 | 43.3 | 97.44 | 18.57 |
| 17 | 25 | 42.4 | 97.90 | 17.52 |
| 18 | 25 | 41.7 | 97.42 | 16.89 |
| 44 | 25 | 42.0 | 97.34 | 17.4 |
| 19 | 30 | 37.1 | 97.93 | 16.24 |
| 45 | 30 | 34.2 | 97.83 | 16.31 |

*Pre-contact temperature: 10° C.

Results of Examples 17-19 show that the alternations of catalyst pre-contact time and pre-contact temperature influence other polymerization properties of the polyolefin catalysts to some extent.

Although preferred embodiments of the present invention have been described above, the present invention is not limited to the specific details of the above described embodiments. In scope of the technical concept of the invention, various simple alterations may be made to the embodiments of the invention, and all of these alterations shall fall within the scope of protection of the present invention. Furthermore, any combination may be made between the various embodiments of the invention as long as such a combination is not in conflict with the purpose of the invention, and such a combination shall be likewise considered as what is disclosed in the invention.

We claim:

1. A catalyst pre-contact method for continuous polymerization of olefins, comprising:
    feeding a catalyst, a cocatalyst, and an optional external electron donor into a pre-contact device having a plurality of inlets and a plurality of outlets to conduct a pre-contact reaction at a pre-contact temperature in a range of from −30° C. to 40° C. for a pre-contact time in a range of from 0.5 min to 70 min to obtain a pre-contact catalyst,
    wherein the pre-contact time is adjusted by feeding the catalyst, the cocatalyst, and the optional external electron donor into one or more of the plurality of inlets in the pre-contact device or withdrawing a mixture containing the catalyst, the cocatalyst, and the optional external electron donor from one of the plurality of outlets so that a residence time of the mixture containing the catalyst, the cocatalyst, and the optional external electron donor in the pre-contact device changes accordingly; and feeding the pre-contacted catalyst into a pre-polymerization system and then into a catalyst polymerization system, or feeding the pre-contacted catalyst directly into a polymerization system.

2. The method of claim 1, wherein the polymerization system utilizes a liquid phase bulk polymerization process, the pre-contact time is in a range of from 1 min to 20 min, and the pre-contact temperature is in a range of from −25° C. to 15° C.

3. The method of claim 1, wherein the polymerization system utilizes a gas phase polymerization process, the pre-contact time is in a range of from 1 min to 20 min, and the pre-contact temperature is in a range of from −30° C. to 30° C.

4. The method of claim 1, further comprising:
determining a desired pre-contact temperature and a desired pre-contact time through laboratory polymerization evaluation experiment;
setting the pre-contact temperature in the pre-contact device to be the desired pre-contact temperature plus or minus 3° C.; and
setting the pre-contact time in the pre-contact device to be the desired duration plus or minus 2 min.

5. The method of claim 1, wherein the pre-contact device comprises at least two catalyst pre-contact tanks connected in series or a tubular reactor having at least two inlets and at least two outlets.

6. A catalyst pre-contact device, comprising:
a catalyst pre-contact tank; and
at least one catalyst pre-contact coil connected to the catalyst pre-contact tank,
wherein the at least one catalyst pre-contact coil has 2 to 20 valved inlets and 2 to 20 valved outlets,
wherein the at least one catalyst pre-contact coil comprises a heating jacket or is immersed in a thermostatic bath.

7. The catalyst pre-contact device of claim 6,
wherein the catalyst pre-contact tank is a stirred-tank having a volume so that an average residence time of the mixture is less than 5 min.

8. The catalyst pre-contact device of claim 6, wherein the catalyst pre-contact coil is further provided with one or more anti-backflowing valves.

9. The catalyst pre-contact device of claim 6, wherein the catalyst pre-contact coil is further provided with one or more globe checks.

10. A catalyst pre-contact device, comprising: a catalyst pre-contact coil having a first end and a second end, a first valved inlet disposed at the first end connected to a first feed pipe, a second valved inlet disposed between the first end and the second end, wherein the second valved inlet is connected to a second feed pipe.

11. The catalyst pre-contact device of claim 10, characterized by at least one of:
that the catalyst pre-contact coil is an internally polished coil;
that the catalyst pre-contact coil is a spring shape coil or serpentine pipe;
that the catalyst pre-contact device further comprises a thermostatic bath, with the catalyst pre-contact coil being positioned within the thermostatic bath; alternatively, the catalyst pre-contact coil is a jacketed coil;
that a pipeline mixer is provided inside the catalyst pre-contact coil and used to mix the materials from the feed pipelines;
that the catalyst pre-contact device comprises two or more catalyst pre-contact coils in parallel; and
that the catalyst pre-contact coil is placed horizontally, vertically or at any other angle.

12. The catalyst pre-contact device of claim 10, wherein a pipeline mixer is provided in the catalyst pre-contact coil, and the pipeline mixer is selected from nozzle type pipeline mixers, vortex pipeline mixers, profile pipeline mixers and static pipeline mixers.

13. A catalyst pre-contact device comprising a plurality of catalyst pre-contact tanks connected in series, each of the plurality of catalyst pre-contact tanks being provided with a temperature adjustable jacket, wherein a catalyst, a cocatalyst and an optional external electron donor pass through one or more of the catalyst pre-contact tanks in series prior to entering a pre-polymeriztion unit or a polymerization unit, thereby a pre-contact time is controlled.

14. The catalyst pre-contact device of claim 13,
wherein the plurality of catalyst pre-contact tanks have a same or different volumes, wherein a total residence time of a material in the plurality of catalyst pre-contact tanks is less than 5 min; and
the plurality of catalyst pre-contact tanks are stirred tanks.

15. The catalyst pre-contact device of claim 8, wherein the catalyst pre-contact coil is provided with an anti-backflowing valve deposited upstream of each of the inlets except for the first inlet.

16. The catalyst pre-contact device of claim 9, wherein the catalyst pre-contact coil is provided with a globe check deposited immediately downstream of each of the outlets.

* * * * *